United States Patent
Carlsmith et al.

[15] 3,680,845
[45] Aug. 1, 1972

[54] AERATING APPARATUS AND METHOD

[72] Inventors: Lawrence A. Carlsmith, Amherst; Kenneth E. Hartz, Nashua, both of N.H.

[73] Assignee: Improved Machinery Inc., Nashua, N.H.

[22] Filed: July 27, 1970

[21] Appl. No.: 58,528

[52] U.S. Cl. ............... 261/37, 261/91, 261/112, 261/120, 210/242
[51] Int. Cl. ............................................. B01f 3/04
[58] Field of Search ...210/242; 261/37, 91, 112, 120

[56] References Cited

UNITED STATES PATENTS

| | | |
|---|---|---|
| 3,493,216 | 2/1970 | Johnson.....................261/112 |
| 2,977,103 | 3/1961 | Smith et al..................261/112 |
| 3,235,234 | 2/1966 | Beaudoin....................261/112 |
| 2,317,951 | 4/1943 | Burk...........................261/112 |
| 1,650,140 | 11/1927 | Kuhni.........................261/112 |
| 1,455,930 | 5/1923 | Nobis..........................261/112 |
| 1,876,142 | 9/1932 | Jones..........................261/112 |
| 1,881,678 | 10/1932 | Klomparens................261/112 |
| 1,886,192 | 11/1932 | Jones..........................261/112 |
| 1,969,986 | 8/1934 | McGrail.......................261/112 |

Primary Examiner—Tim R. Miles
Assistant Examiner—Steven H. Markowitz
Attorney—Carl R. Horten, David W. Tibbott and Robert R. Paquin

[57] ABSTRACT

Aerating apparatus comprising a floating support carrying a wall having an upwardly facing surface provided with depressions, protrusions, screens or other means for promoting and accelerating the aeration of liquid flowing thereacross. A discharge nozzle is located generally centrally of the surface for supplying liquid at the elevation of the thereadjacent portion of the surface; and the surface slopes downwardly from the discharge nozzle and at its periphery is at an elevation at least as low as, and preferably at, the upper level of the surrounding liquid. Also, an aerating method wherein liquid is supplied onto the surface generally centrally thereof at the elevation of the surface, the liquid is caused to flow outwardly across the surface while being intermixed with air and turbulence is caused in the liquid to promote and accelerate its aeration, and the aerated liquid is discharged from the periphery of the surface with the periphery at the elevation of the upper level of the surrounding liquid.

12 Claims, 7 Drawing Figures

PATENTED AUG 1 1972

3,680,845

INVENTORS
LAWRENCE A. CARLSMITH
KENNETH E. HARTZ
BY
Robert R. Paquin
ATTORNEY

AERATING APPARATUS AND METHOD

BACKGROUND OF THE INVENTION

The present invention relates to aerating apparatus and methods and more particularly to apparatus and methods adapted for aeration of a liquid such as, for example, waste water effluent or sewage.

The treatment of liquid waste, such as effluent or sewage, generally includes aeration of the waste to provide oxygen for employment in the metabolism of the waste. Conventionally, this aeration is frequently accomplished by means of surface aerators which may be floated or otherwise supported adjacent the upper level of a body of the waste. Commercially available surface aerators generally comprise merely a pump which pumps the liquid above the body of the liquid whereupon the pumped liquid falls by gravity directly back to the liquid body. Prior patents do disclose surface aerators comprising a wall having an upper surface which is positioned adjacent the upper level of the liquid and which at its outer periphery is substantially spaced above such upper liquid level. In the operation of these latter aerators, the liquid is usually pumped to a head above the surface whereupon it downwardly cascades onto the surface generally centrally thereof and thence flows across the surface to its periphery where the liquid is discharged in a downwardly cascading flow to the upper level of the surrounding liquid.

Such prior patented aerators are extremely inefficient in oxygen transfer per unit of surface area; and hence their surfaces must necessarily be of undesirably large diameter to maintain the liquid separated from the main body of liquid for a period sufficient to provide adequate aeration. Also, such aerators are inefficient and uneconomical in operation as, due to their requirement for downwardly cascading flows during the supply of liquid to the surface and discharge of liquid off of the periphery of the surface, the liquid must be pumped to an unduly high head during its supply to the surface.

SUMMARY OF THE INVENTION

An object of the present invention is to provide new and improved aerating apparatus which is particularly constructed and arranged to provide more efficient aeration of the liquid.

Another object of the invention is to provide new and improved aerating apparatus which is particularly constructed and arranged to substantially minimize the head to which the liquid must be pumped during its supply to the surface.

These objects, and other objects and advantages which will be apparent from the following description taken in connection with the accompanying drawings, are attained by the provision of aerating apparatus which may comprise supporting means, wall means carried by the supporting means to be supported thereby adjacent the upper level of a body of the liquid to be aerated with a surface of the wall means facing upwardly from the liquid, means providing flow passage means adapted for receiving liquid when the wall means is so supported and having discharge means for discharging liquid from the flow passage means onto the surface of the wall means, the discharge means being constructed to cause liquid supplied through the discharge means to flow onto the surface without cascading downwardly thereto, pump means operatively associated with the flow passage means for pumping liquid through the flow passage means and discharge means whereby the liquid is supplied to said surface without cascading downwardly thereto, the surface sloping downwardly from the discharge means towards its periphery to facilitate liquid flow across the surface towards its periphery and the surface being provided with means for causing turbulence in liquid flowing thereacross to promote and accelerate aeration of such liquid during said flow, and the periphery of the surface being, when the wall means is supported by the supporting means adjacent the upper level of a body of liquid, at an elevation at least as low as the upper level of the surrounding liquid.

DESCRIPTION OF THE PREFERRED EMBODIMENTS

Figure 1:
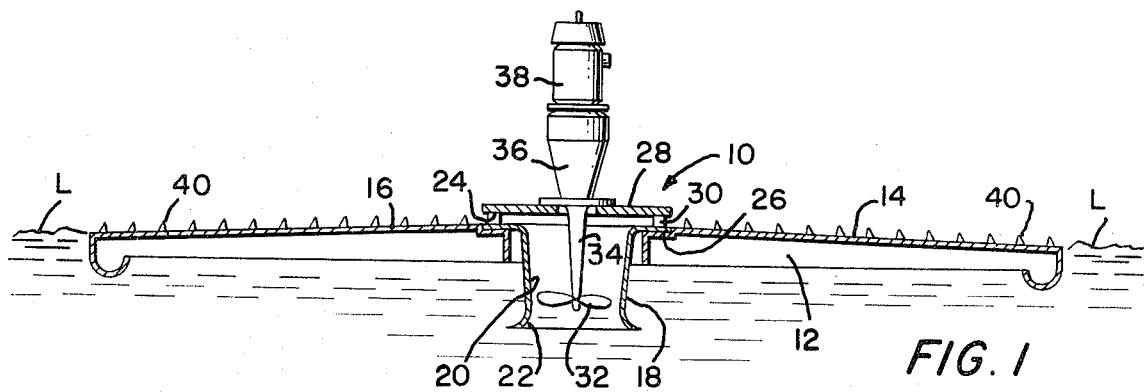
FIG. 1 is an elevational view, partially broken away and in section, illustrating one embodiment of the aerating apparatus provided by the invention.
Figure 2:
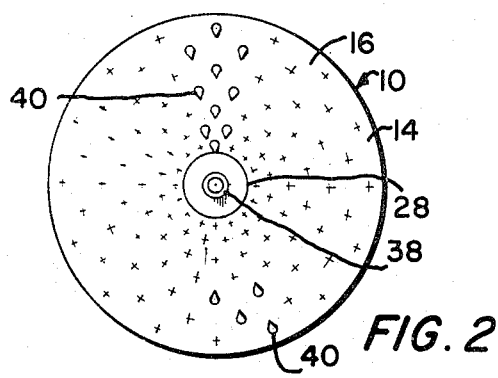
FIG. 2 is a reduced size, top or plan view of the aerating apparatus shown in FIG. 1.

Referring more particularly to the drawings wherein similar reference characters designate corresponding parts throughout the several views, FIGS. 1 and 2 illustrate an aerating apparatus designated generally as 10 which is operatively disposed in a body of the effluent, sewage or other liquid to be aerated. The aerating apparatus 10 comprises an annular support or supporting means 12 filled with foam or otherwise suitably constructed to be adapted to float in the body of the liquid. The support 12 carries an annular wall or wall means 14 whereby when the support 12 is floating in the liquid the wall 14 is located adjacent the upper level L of the surrounding liquid and has an annular surface 16 facing upwardly from the liquid and exposed to the air thereabove. The surface 16 of the wall 14 is preferably formed of corrosion resistant material such as a suitable plastic and, as will be hereinafter more specifically described, is provided with means for causing turbulence in liquid flowing thereacross to promote and accelerate aeration of the liquid during such flow. An annular pump shroud 18 is carried by the support 12 and projects through aligned centrally located openings in the support 12 and wall 14. The pump shroud 18 peripherally bounds an upwardly widening liquid flow passage 20 and has an outwardly flaring lower or intake end 22 depending below the support 12 to bound the lower or intake end of the flow passage 20. The other or upper end of the flow passage 20 is provided with discharge means located generally centrally of the surface 16 and constructed to supply liquid onto the thereadjacent inner end of the surface 16 contiguous with the latter. This discharge means, as illustrated, comprises a generally annular discharge nozzle or orifice 24 at the elevation of such surface inner end and directing the liquid radially outwardly over the surface 16. The lower side of the discharge nozzle 24 is formed by an outwardly projecting annular wall 26, formed integrally with the pump shroud 18, which generally slopes downwardly as it extends outwardly and its outer end is aligned with the thereadjacent inner end of the annular wall 14. The upper side of the discharge nozzle 24 is formed by the peripheral portion of an annular plate 28 which extends generally horizontally above the pump shroud 18 and is mounted on the wall 26 by supporting posts 30 at arcuate intervals around the discharge nozzle 24.

The surface 16 gradually slopes downwardly in all radial directions from the discharge nozzle 24 towards its periphery to facilitate liquid flow outwardly across the surface 16 to the periphery. The periphery of the surface 16 is at an elevation at least as low as, and preferable as illustrated at, the upper level L of the surrounding liquid when the apparatus 10 is operatively located in a body of the liquid to be aerated. Hence, as the surface periphery is at such low elevation and liquid is supplied onto the surface inner end contiguous therewith, the head to which the liquid must be pumped during its supply to the surface 16 is substantially minimized.

The apparatus 10 includes a low head pump for pumping liquid upwardly through the flow passage 20 and outwardly through the discharge nozzle 24 onto the inner end of the surface 16. More particularly, this pump as illustrated comprises an impeller 32 which is located in the flow passage 20 and mounted on the lower end of a vertical drive shaft 34. The upper end of the drive shaft 34 is connected through a conventional gear reducer or reduction gearing system 36 to be rotatably driven by a drive motor 38 which is supported by the gear reducer 36 on the annular plate 28. The size of the motor 38 and the ratios of the gears of the gear reducer 36 are selected to cause the impeller 32 to be rotatably driven by the motor 38 at substantially the minimal rotary speed sufficient for the impeller 32 to pump the liquid through the flow passage 20 and discharge nozzle 24.

The surface 16 carries means particularly adapted to cause turbulence in liquid flowing outwardly thereacross to promote and accelerate the aeration of such liquid. More specifically, during the flow of liquid outwardly across the surface 16, the turbulence created by this means provides a substantial increase in the surface of the liquid directly exposed to the air to maximize air-to-liquid contact and also provides intermixing of the aerated and unaerated portions of the liquid. As a result, the aerating apparatus provided by the invention posesses substantially greater aerating efficiency per unit of area of the surface 16 than prior aerators of its type; and the diameter of the surface 16 may be substantially minimized as compared to such prior aerators.

This turbulence causing means is in the configuration of relatively small baffles or protrusions 40 individually mounted on the wall 14 to project outwardly from the surface 16 at spaced intervals throughout the surface 16. The size, arrangement and spacing of the protrusions 40 are, of course, capable of many variations; however, the protrusions 40 should be arranged and sufficiently closely located to prevent the provision of wide flow passages therebetween. Thus, for example, as illustrated in FIG. 2, the protrusions 40 may be arranged in a plurality of concentric annular rows encircling or surrounding the discharge nozzle 24 with the protrusions 40 of each annular row staggered or misaligned with those of the next adjacent row or rows.

In the operation of the aerating apparatus 10, the impeller 32 is continuously rotatably driven by the motor 38 to pump liquid upwardly through the flow passage 20 and outwardly through the discharge nozzle 24 onto the inner end of the surface 16. The liquid, thus supplied to the surface contiguous therewith and at minimal velocity, flows outwardly across the surface 16 towards its periphery and during such flow is subjected to the baffles or protrusions 40 which cause intermixing of the uppermost oxygen rich liquid with the liquid therebelow and rearrangement of the liquid to thereby expose a substantial surface of the liquid to the thereabove air. Thus, the liquid becomes aerated in a highly efficient manner during its flow across the surface 16 and the diameter of the surface 16, as aforementioned, may be minimized. The aerated liquid is discharged from the periphery of the surface 16 to the body of the liquid contiguous with the upper level L of the surrounding liquid.

FIGS. 3 through 7 illustrate aerating apparatus which include alternative turbulence causing means for promoting and accelerating the aeration process, such aerating apparatus being identical to the aforedescribed aerating apparatus 10 with the exception of the included form of such means. Hence, the aerating apparatus of FIGS. 3 through 7 have been only fragmentarily illustrated; and corresponding reference characters followed by appropriate suffixes have been employed to designate parts of the apparatus of FIGS. 3 through 7 identical to parts of the aforedescribed apparatus 10.

More particularly, FIG. fragmentarily illustrates an embodiment of the aerating apparatus in the form of an apparatus 10a wherein the turbulence causing means comprises a plurality of apertured elements or screens 42 mounted on the wall 14a to project upwardly from the surface 16a and, although illustrated as being pluralities of arcuately spaced elements individually mounted on the wall 14a in annular concentric rows similar to the arrangement of the protrusions 40 in FIGS. 1 and 2, may alternatively if desired be a plurality of annular screens mounted in radially spaced relationship around the discharge nozzle of the apparatus 10a. The liquid flowing outwardly across the surface 16a in the direction of the flow arrow A is broken up into relatively small streams of liquid which pass through the apertures or openings 44 of the screens 42. Hence, the screens 42 cause a relatively large surface of the liquid to be exposed to the air and cause turbulence in the liquid whereby aerated and unaerated portions of the liquid are intermixed, to thereby promote and accelerate aeration of the liquid.

Figure 4:
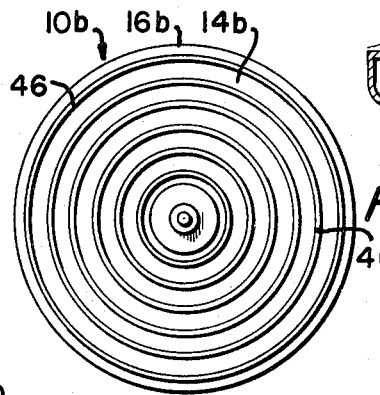
FIG. 4 is a top or plan view illustrating a third embodiment of the aerating apparatus provided by the invention.

FIG. 4 illustrates an embodiment in the form of an apparatus 10b wherein the turbulence causing means comprises a plurality of concentric, radially spaced annular baffles 46 mounted on the wall 16b to project upwardly from the surface 14b. The baffles 46 encircle the discharge nozzle of the apparatus 10b and may, if desired, be constructed with upper surfaces in the form of ramps inclining outwardly towards the periphery of the surface 16b. The baffles 46, hence, longitudinally extend laterally to the flow of liquid across the surface 16b and, as will be seen, cause turbulence in the liquid flowing outwardly across the surface 16b to provide intermixing of the uppermost oxygen rich liquid to expose a substantial surface thereof to the air above the surface 16b.

Figure 5:
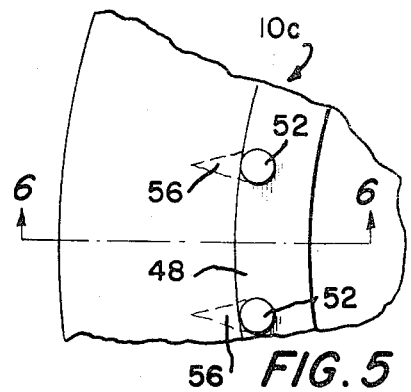
FIG. 5 is a top or plan view fragmentarily illustrating another embodiment of the aerating apparatus of the invention.
Figure 3:
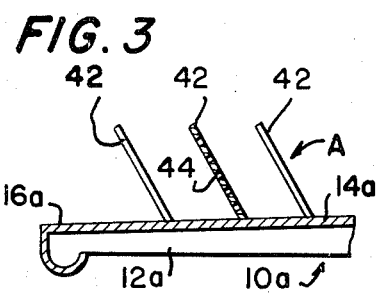
FIG. 3 is a fragmentary elevational sectional view illustrating another embodiment of the aerating apparatus provided by the invention.
Figure 6:
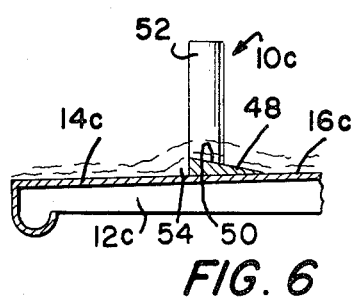
FIG. 6 is an enlarged fragmentary elevational sectional view of the apparatus shown in FIG. 5, taken on line 6—6 of FIG. 5 looking in the direction of the arrows.

FIGS. 5 and 6 illustrate an embodiment in the form of an apparatus 10c in which the turbulence causing means again includes a plurality of upstanding concentric annular baffles 48 mounted on the wall 14c to project upwardly from the surface 16c and encircling the discharge nozzle. The baffles 48 each along their upper surfaces 50 incline towards the periphery of the surface 16c and each at arcuately spaced locations along their lengths mount upstanding vertical posts 52 which project further outwardly or upwardly from the surface 16c. The outer or downstream side of each post 52, as shown in FIG. 6, is substantially flush or even with the corresponding side of the annular baffle 48 on which the post 52 is mounted. In the operation of the apparatus 10c, liquid flowing outwardly across the surface 16c from the discharge nozzle is deflected upwardly over the upper surface or each baffle 48 and is discharged on the downstream side of each baffle 48 in a fall having an air picket 54 therebelow. The posts each interrupt the liquid flow at their locations such that a vertical liquid-free space (schematically depicted as 56) is provided immediately adjacent the downstream side of each post 50, such liquid-free spaces are serving to communicate the air pockets 54 with the air above the liquid flowing across the surface 16c. The air received by the air pockets 54 through the spaces 56 acts to aerate the lowermost level of the liquid as such passes over the plates 48; and hence, in the operation of this embodiment the liquid is aerated at both its uppermost and lowermost levels while aerated and unaerated portions of the liquid are intermixed by turbulence caused by the baffles 48 and posts 52.

Figure 7:
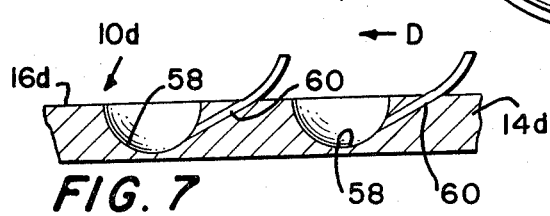
FIG. 7 is a fragmentary elevational sectional view of yet another embodiment of the aerating apparatus of the invention.

FIG. 7 fragmentarily illustrates an embodiment in the form of an apparatus 10d wherein individual recesses 58 are formed in the surface 16d at locations throughout the (i.e., The recesses 58 may be arranged in any desired pattern and spaced in any desired spacing, for example, the arrangement and spacing of the protrusions 40 shown in FIGS. 1 and 2 would be suitable for the recesses 58. The recesses 58 are each provided at their upstream end i.e., their end most adjacent to the discharge nozzle of the apparatus 10d) with a vent tube 60 at its lower end communicating with the respective recess 58 and at its upper end at an elevation above the upper level of the liquid flowing across the surface 16d. The vent tubes 60 hence individually vent the recesses 58 to the air above the liquid following across the surface 16d. In the operation of the apparatus 10d, liquid flowing outwardly across the surface 16d in the direction shown schematically by the arrow D is aerated at both its uppermost and lowermost levels while aerated and unaerated portions of the liquid are intermixed by turbulence caused by the recesses 58.

In summary, in accordance with the present invention, liquid may be aerated by a method which may comprises the steps of supplying the liquid onto a surface located adjacent the upper level of a body of the liquid to be aerated whereby the liquid is so supplied generally centrally of the surface and contiguous therewith, causing the supplied liquid to flow outwardly across the surface towards the periphery thereof while aerating the liquid and causing turbulence in the liquid to promote and accelerate its aeration, and discharging the liquid from the periphery of the surface to the body of the liquid with such periphery at least as low as and preferably at the upper level of the surrounding liquid. It will be seen that in the practice of this method the turbulence in the liquid may be created, for example, in any of the aforedescribed manners.

Although we have illustrated and hereinbefore specifically described only five embodiments of our invention, it will be understood that the invention is not limited merely to these few embodiments, but rather contemplates other embodiments and variations constructed in accordance with the aforegoing teachings. Also, it will be understood that, although we have illustrated and specifically described each form of turbulence causing means as being the sole form of such means in an embodiment of the invention, the invention contemplates the employment of two or more different forms of turbulence causing means in a single embodiment of the invention.

Having thus described our invention, we claim:

1. Aerating apparatus comprising supporting means; wall means carried by said supporting means to be supported thereby adjacent the upper level of a body of the liquid to be aerated with a surface of the wall means facing upwardly from the liquid; means providing flow passage means adapted for receiving liquid when said wall means is so supported and having discharge means generally centrally of said surface for discharging liquid from said flow passage means onto said surface; said discharge means being at the level of the thereadjacent portion of said surface to cause liquid supplied through said discharge means to flow onto said surface without cascading downwardly thereto and said surface sloping downwardly from said discharge means towards its periphery to facilitate liquid flow across said surface towards its periphery; pump means operatively associated with said flow passage means for pumping liquid through said flow passage means and discharge means whereby the liquid is supplied to said surface without cascading downwardly thereto; the periphery of said surface being, when said wall means is supported by said supporting means adjacent the upper level of a body of liquid, at an elevation at least as low as the upper level of the surrounding liquid; said surface being provided with means for causing turbulence in liquid flowing thereacross for promoting and accelerating aeration of such liquid during such flow; said turbulence causing means permitting liquid flow from said discharge means to the periphery of said surface in substantially all radial directions; and said turbulence causing means comprising baffle means longitudinally extending around said discharge means and post means projecting outwardly form said baffle means at locations spaced along the length of the latter.

2. Aerating apparatus according to claim 1, wherein said baffle means includes an upper surface facing away from said surface of said wall means which slopes from said discharge means towards the periphery of said wall means surface, and said baffle means and said post means include sides remote from said discharge means which are substantially flush with one another.

3. Aerating apparatus comprising supporting means; wall means carried by said supporting means to be supported thereby adjacent the upper level of a body of the liquid to be aerated with a surface of the wall means facing upwardly from the liquid; means providing flow passage means adapted for receiving liquid when said wall means is so supported and having discharge means generally centrally of said surface for discharging liquid from said flow passage means onto said surface; said discharge means being at the level of the thereadjacent portion of said surface to cause liquid supplied through said discharge means to flow onto said surface without cascading downwardly thereto and said surface sloping downwardly from said discharge means towards its periphery to facilitate liquid flow across said surface towards its periphery; pump means operatively associated with said flow passage means for pumping liquid through said flow passage means and discharge means whereby the liquid is supplied to said surface without cascading downwardly thereto; and the periphery of said surface being, when said wall means is supported by said supporting means adjacent the upper level of a body of liquid, at an elevation at least as low as the upper level of the surrounding liquid; said surface being provided with means for causing turbulence in liquid flowing thereacross for promoting and accelerating aeration of such liquid during such flow; said turbulence causing means permitting liquid flow from said discharge means to the periphery of said surface in substantially all radial directions; and said turbulence causing means comprising at least one baffle projecting outwardly from aid surface and longitudinally extending around said discharge means, and a plurality of spaced post elements associated with said baffle end projecting outwardly therefrom.

4. Aerating apparatus comprising supporting means; wall means carried by said supporting means to be supported thereby adjacent the upper level of a body of the liquid to be aerated with a surface of the wall means facing upwardly from the liquid; means providing flow passage means adapted for receiving liquid when said wall means is so supported and having generally annular discharge means generally centrally of said surface for discharging liquid from said flow passage means onto said surface; said surface sloping downwardly from said discharge means towards its periphery to facilitate liquid flow across the surface to its periphery; pump means operatively associated with said flow passage means for pumping liquid through said flow passage means and discharge means onto said surface; said surface being provided with means for causing turbulence in liquid flowing thereacross for promoting and accelerating aeration of such liquid during such flow; said turbulence causing means permitting liquid flow from said discharge means to the periphery of said surface in substantially all radial directions; and said turbulence causing means comprises baffle means longitudinally extending around said discharge means and posts means projecting outwardly from said discharge means at locations spaced along the latter.

5. Aerating apparatus comprising supporting means; wall means carried by said supporting means to be supported thereby adjacent the upper level of a body of the liquid to be aerated with a surface of the wall means facing upwardly from the liquid; means providing flow passage means adapted for receiving liquid when said wall means is so supported and having generally annular discharge means generally centrally of said surface for discharging liquid from said flow passage means onto said surface; said surface sloping downwardly from said discharge means towards its periphery to facilitate liquid flow across the surface to its periphery; pump means operatively associated with said flow passage means for pumping liquid through said flow passage means and discharge means onto said surface; said surface being provided with means for causing turbulence in liquid flowing thereacross for promoting and accelerating aeration of such liquid during such flow; said turbulence causing means permitting liquid flow from said discharge means to the periphery of said surface in substantially all radial directions; and said turbulence causing means including at least one baffle projecting outwardly from said surface and longitudinally extending around said discharge means, and a plurality of post elements projecting outwardly from said baffle at locations spaced along the length thereof.

6. Aerating apparatus according to claim 5, wherein said baffle includes an upper surface facing away from said surface of said wall means which slopes upwardly from said discharge means towards the periphery of said wall means surface.

7. Aerating apparatus according to claim 5, wherein said baffle and said post elements include sides remote from said discharge means which are substantially flush with one another.

8. Aerating apparatus comprising supporting means; wall means carried by said supporting means to be supported thereby adjacent the upper level of a body of the liquid to be aerated with a surface of the wall means facing upwardly from the liquid; means providing flow passage means adapted for receiving liquid when said wall means is so supported and having generally annular discharge means generally centrally of said surface for discharging liquid from said flow passage means onto said surface; said surface sloping downwardly from said discharge means towards its periphery to facilitate liquid flow across the surface to its periphery; pump means operatevely associated with said flow passage means for pumping liquid through said flow passage means and discharge means onto said surface; said surface being provided with means for causing turbulence in liquid flowing thereacross for promoting and accelerating aeration of such liquid during such flow; said turbulence causing means permitting liquid flow from said discharge means to the periphery of said surface in substantially all radial directions; and said turbulence causing means comprising annular baffles projecting from said surface and encircling said discharge means, and spaced post elements operatively associated with said baffles to project outwardly therefrom.

9. Aerating apparatus according to claim 8, wherein said baffles include upper surfaces which incline as they extend from said discharge means.

10. Aerating apparatus comprising a floatable support; wall means carried by said support such that, when said support is floated in a body of liquid, said wall means is adjacent the upper level of the liquid and has a surface facing upwardly from the liquid and exposed to air thereabove; means defining flow passage means adapted for receiving liquid below said wall means when said wall means is so supported and having discharge means for discharging liquid from said flow passage means onto said surface of said wall means; said discharge means including a generally annular discharge orifice located generally centrally of said surface operatively discharging liquid onto said surface generally centrally thereof and said surface sloping downwardly from said discharge orifice towards its periphery to facilitate liquid flow across the surface to its periphery; pump means operatively associated with said flow passage means for pumping liquid through said flow passage means and discharge means onto said surface; and means operatively associated with said surface for promoting the quantity of the liquid flowing thereacross directly exposed to air and providing intermixing of aerated and unaerated portions of such liquid during such flow; said promoting means comprising at least one baffle projecting outwardly from said surface and longitudinally extending around said discharge means, said baffle permitting flow of liquid outwardly from said discharge means to the periphery of said surface over the outermost surface of said baffle and being of length to prevent liquid flow from said discharge means to such periphery around said baffle, and said promoting means also comprising a plurality of post elements projecting further outwardly from said baffle at locations along the length of said baffle.

11. Aerating apparatus according to claim 10, wherein said outermost surface of said baffle slopes upwardly from said discharge means towards the periphery of said surface, and the side of said outermost surface most remote from said discharge means is spaced above the thereadjacent portion of said wall means surface.

12. Aerating apparatus according to claim 11, wherein the sides of said baffle and posts remote from said discharge means are substantially flush with one another.

* * * * *